United States Patent [19]

Smitherman, Jr. et al.

[11] 3,891,593

[45] June 24, 1975

[54] METHOD AND APPARATUS FOR DISSOLUTION OF POLYMER IN SOLVENT

[75] Inventors: Chester L. Smitherman, Jr.; Robert H. Overcashier; Vitold R. Kruka, all of Houston, Tex.

[73] Assignee: Shell Oil Company, Houston, Tex.

[22] Filed: Aug. 8, 1972

[21] Appl. No.: 279,132

[52] U.S. Cl. ............ 260/34.2; 137/13; 260/33.6 A; 260/33.6 AQ; 260/33.6 PQ
[51] Int. Cl. ........ B01f 1/00; C08f 45/28; F17d 1/16
[58] Field of Search ...... 260/34.2, 33.6 PQ, 33.6 A, 260/33.6 AQ; 23/271, 272.6 R; 137/13

[56] References Cited
UNITED STATES PATENTS

| 994,679 | 6/1911 | Hills | 23/271 |
|---|---|---|---|
| 1,651,680 | 12/1927 | Eagle | 23/271 |
| 1,943,330 | 1/1934 | Mitchell | 23/271 |
| 2,573,949 | 11/1951 | Blizzard | 260/34.2 |
| 2,584,910 | 2/1952 | Ohlwiler | 23/272.6 R |
| 2,639,275 | 5/1953 | Vickers et al. | 260/34.2 |
| 3,687,148 | 8/1972 | Kruka et al. | 260/33.6 A |

FOREIGN PATENTS OR APPLICATIONS

| 18,922 | 8/1905 | United Kingdom | 23/271 |

Primary Examiner—Allan Lieberman

[57] ABSTRACT

Process and apparatus for dissolving a polymer in a solvent; the process encompasses bubbling a gas through a slurry of polymer particles and the solvent; the apparatus is a dissolution vessel having a liquid space divided into at least two vertically oriented compartments in liquid communication with each other both above and below the dividing means.

14 Claims, 3 Drawing Figures

PATENTED JUN 24 1975    3,891,593

3,891,593

METHOD AND APPARATUS FOR DISSOLUTION OF POLYMER IN SOLVENT

BACKGROUND OF THE INVENTION

One hindrance to the use of high molecular weight polymers as friction reducing agents for the pipeline transportation of hydrocarbons, such as crude oil and fractions thereof, is that the polymers are often difficult to dissolve in the oil or other liquids when the polymer is of a molecular weight sufficiently high to give the desired improvement, particularly friction reduction. Previously, it has been the prevailing practice of the art to charge the polymeric material into a kneader and then very gradually add small amounts of the liquid until a mixture of sufficient consistency is produced to permit discharge into the main liquid body. It has also been a practice to cut, tear or mill the polymeric material into small particles by subjecting the polymer to a severe milling operation or to mastication with mixing equipment, such as kneaders, banburys, or extruders. Excessive milling is frequently quite harmful to the polymer, tending to break it down so that a final product is of lower molecular weight and many desirable qualities are lost. As a further drawback, heavy equipment is expensive, power requirements for the use of such equipment are large and batch sizes are generally limited, all of which result in increased blending costs. If the polymer and solvent are agitated with application of heat, the agitation and heating may also lower the molecular weight and, further, will be slow in achieving complete solution. Such slow procedure is expensive.

One process for dissolution described in U.S. Pat. No. 2,639,275 involves passing the polymeric material through an extruder and into an apparatus equipped with a series of orifice plates, mixing chambers, and screens, the orifices in the progressive plates being diminishing in diameter, each orifice plate, screen bundle, and mixing chamber being so equipped that a heated pressurized liquid compatible with the polymeric material is admixed with the polymer at these stages. While solution utilizing this apparatus may occur in as short a time as 5 minutes or less, the process suffers from the serious disadvantage that the polymer is seriously degraded, and particularly in the case of high molecular weight polymers, is degraded to a point of substantial uselessness for friction reduction.

In accordance with another prior art process as disclosed in U.S. Pat. No. 2,771,458, the size of the polymer particles which are being dissolved are maintained uniform and below one-fourth inch in diameter, preferably about one-sixteenth inch such that high viscosity blends which are homogeneous and lump-free can be obtained by simple agitation. However, the process requires a high viscosity solvent and may suffer from degradation.

The present invention overcomes the above described difficulties and provides a successful solution to the problems of the prior art, as will be apparent from the following description thereof.

SUMMARY OF THE INVENTION

The primary purpose of this invention resides in providing a process and apparatus whereby a high molecular weight polymer can be efficiently and economically dissolved on a large scale in a solvent without being significantly degraded.

The above purpose has been achieved by forming a slurry of polymer particles with solvent and sparging the slurry with a gas.

The apparatus of this invention broadly extends to a dissolution chamber having a liquid space in the lower part thereof and a vapor space in the upper part thereof, means dividing the liquid space into at least two vertically oriented substantially separate compartments having baffle shielded corners in liquid communication with each other both above and below the dividing means, gas dispersing means adapted to disperse a substantial stream of gas selectively into the lower part of at least one but less than all of the compartments, a gas inlet communicating with the gas dispersing means, at least one vapor outlet from the vapor space, and means for placing slurry into or removing liquid from the liquid space.

The method of this invention broadly extends to carrying out the dissolution of polymer in solvent involving establishing a slurry of small polymer particles in solvent in a circuit oriented in a substantially vertical plane, continuously introducing a stream of gas into a lower part of at least one vertical conduit of said circuit to cause upflow of slurry therein, resulting in circulation of said slurry through said circuit, and withdrawing the gas from a vapor space communicating with the uppermost portion of said circuit.

Within the framework of the above described method and apparatus, the present invention not only solves the above-mentioned problems of the prior art, but also achieves further significant advantages as will be apparent from the description of the preferred embodiments following.

DESCRIPTION OF THE PREFERRED EMBODIMENTS

Figure 1:
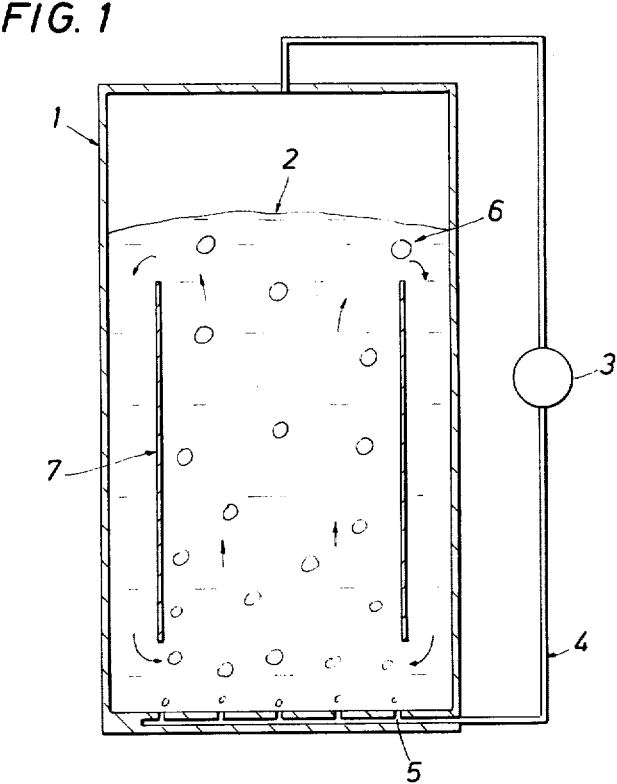
FIG. 1 discloses a batch type dissolution vessel.

In accordance with the present invention, agitation to provide dissolution of a polymer in solvent is limited to the "bubbling method" conventionally known as sparging. The primary purpose of sparging in this invention is to disperse the solid polymer particles throughout the solvent. Dispersion is required so as to provide a large polymer surface area for dissolution. Without agitation the polymer particles agglomerate, effectively provide a smaller surface area, and slow the dissolution process. A secondary benefit of sparging is that it also assists in "washing" disentangled polymer molecules away from the polymer particles while the level of agitation is sufficiently low so as not to degrade the dissolved polymer.

The basic method in accordance with the invention for dispersing gas in a liquid contained in a tank or vessel is to introduce the gas through an open end stand pipe, a horizontal perforated pipe, or a perforated plate at the bottom of the tank. Although the size of the bubbles is a function of the diameter of the orifice through which the gas is introduced at low rates, at ordinary gasing rates relatively large bubbles are produced regardless of the size of the orifice.

Perforated pipe or plate spargers employed in accordance with the invention have orifices 1/16 to 1.0 inch in diameter. The perforated pipe sparger is designed so that the pressure drop across the individual orifices is large compared with the pressure drop down the length of the pipe plus the hydraulic head of the tank contents; otherwise, the orifices most remote from the gas supply may not function. If separate leads are employed for each sparger orifice a high resistance in the leads will again assure uniform sparging through all orifices.

Porous plates, tubes, discs, or other shapes are made for use with the invention by bonding together carefully sized particles of carbon, ceramics, or metal. The resulting septa are used as spargers to produce much smaller bubbles than will result from a simple bubbler. The size of the bubbles formed is proportional to the pore diameter but also to the pressure drop across the septum. At high gas rates coalescense occurs above the septum and poor gas dispersion results.

The position and design of spargers useful with the invention is critical if the best suspensions are to be obtained; in small cylindrical tanks the spargers are shaped concentric with the tank and are located about one-half to three-fourths of the distance from the center of the wall of the tank. Room is left to allow the whole contents of the tank to circulate vertically.

The solvents with which the present invention is most concerned are generally low in viscosity. Thus, crude oil encompasses a preferred embodiment of the present invention inasmuch as it is desirable to incorporate polymer into crude to facilitate pipeline pumping thereof. However, the invention, of course, extends to water, and all fractions of crude oil.

The gas employed for sparging by the present invention is preferably nitrogen and light ends from the solvent but may include all non-toxic and otherwise unharmful gases. If the solvent is a hydrocarbon, such gases as methane, propane, and other hydrocarbons are suitable. It is, however, desirable that all oxygen be excluded from contact with the polymer if the polymer is subject to oxidative attack inasmuch as it will have harmful effects upon the polymer. Either centrifugal compressors or positive displacement pumps may be employed to circulate the gas phase. In case of hydrocarbon systems and heated dissolution tanks, some condensations will occur in the pump unit and return lines but this will not have any ill effects and may be eliminated by conventional knock-out pots.

The polymer to be employed in the process generally extends to all polymers of high molecular weight. Examples of such polymers are polyisobutylene, polybutylene, polyisoprene, ethylene-propylene copolymer, polybutadiene, and the like. Such polymers have heretofore been very difficult to dissolve without degradation in the solvents encompassed by the present invention.

Referring now to the apparatus employing the above system of materials, FIG. 1 of the drawings discloses the simplest device anticipated by the present invention. A tank 1, preferably though not necessarily cylindrical, is partially filled with a solvent 2 to leave a vapor space at the top of the tank. Gas or vapor is pumped from the top of the tank by compressor or pump 3 through return line 4 and back into the tank via gas ports 5. The gas bubbles 6 thus introduced into the solvent and dispersed polymer particles rise in the solvent through a draft tube 7 and substantially escape from the solvent at the liquid-vapor interface. The gas bubbles in the draft tube decrease the effective density of the fluid in the draft tube. The difference in effective densities of the fluid inside and outside the draft tube creates a pressure differential at the bottom of the tank between the two chambers. This pressure differential generates flow of the solvent and dispersed polymer. In the example cited the flow of solvent and dispersed polymer is up in the draft tube and down in the annulus.

Figure 2:
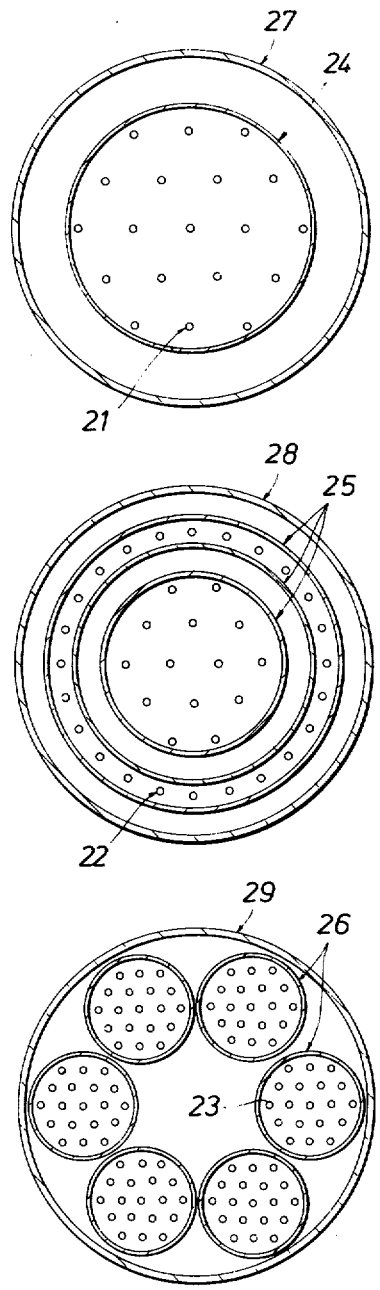
FIG. 2 discloses various patterns of draft tubes which may be employed in the apparatus of FIGS. 1 and 3.

FIG. 2 of the invention discloses various patterns which may be employed for draft tubes. Gas is admitted into the tubes via gas ports 21, 22 and 23 so that it ascends through draft tubes 24, 25 and 26 which are in turn located inside tank walls 27, 28 and 29. The simplest arrangement of draft tube is shown in the uppermost embodiment of FIG. 2 which discloses a single concentric draft tube extending up through the tank through which gas is admitted so that it circulates in a vertical direction. In the middle embodiment of FIG. 2 a somewhat more complex design is disclosed wherein multiple concentric tubes are employed so that gas rises in the middle of the center tube to circulate the solvent up the center tube and down the second tube; likewise, gas is admitted into the third tube, counting from the center, to circulate solvent downwardly both outside the third tube and inside the second tube. In the embodiment at the bottom of FIG. 2, a non-concentric plurality of tubes is employed wherein gas is admitted up through the tubes and down through the rest of the tank to ensure continuous circulation.

Figure 3:
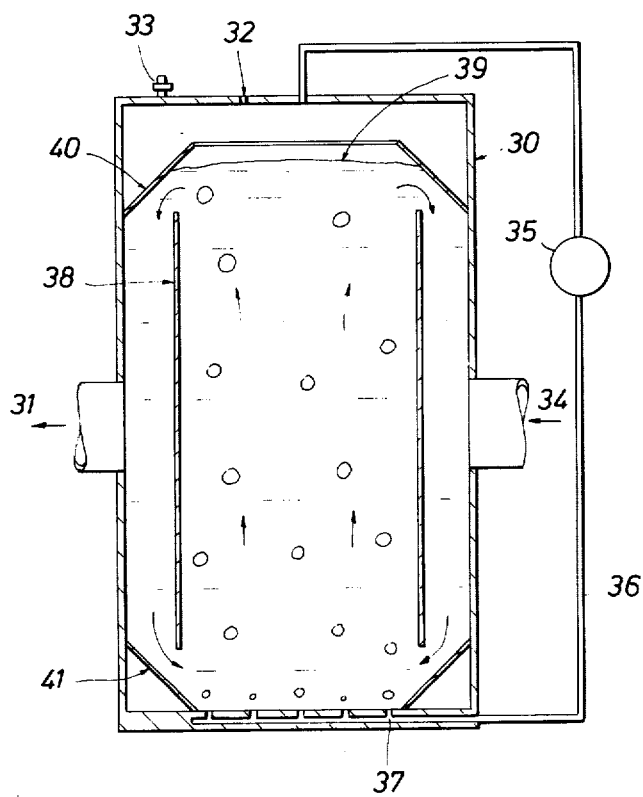
FIG. 3 discloses a continuous type dissolution vessel with internal baffles.

In FIG. 3 of the drawings, an apparatus for continuous operation is disclosed. Solvent with dissolved polymer is withdrawn continuously from tank 30 via relatively large outlet 31 which is designed to have a slow flow rate which will not tend to remove undissolved polymer particles from the dissolution vessel. Meanwhile, polymer is continuously introduced via inlet 32 to the tank which has a flame arrestor blowoff valve 33, and oil or other solvent is admitted to the tank through line 34. Fluid flow may be reversed in outlet 31 and inlet 32 to clean filters. Gas is continually circulated through the contents of the dissolution vessel by compressor or pump 35 via gas return line 36 and into gas ports 37 upwardly through draft tube 38. Solvent and dispersed polymer particle flow direction is upward inside the draft tube as indicated by the arrows and then down the outside of the draft tube after being deflected by a top baffle 40. Such a baffle is very useful for polymers less dense than the solvent. On reaching the bottom of the tank wall, the polymer is diverted back into the tube by bottom baffles 41 which are most useful for polymers more dense than the solvent. In general, the baffles serve to keep the polymer from collecting in corners of the vessel and to keep the polymer in continuous flow. The position of the draft tube within the tank is generally controlled so that the distance between the edge of the draft tube and the baffles is equal to or less than the distance between the draft tube and the tank wall. This ensures a thorough sweeping action about the edges of the draft tube and eliminates any dead spots in the vessel.

To maintain good dispersion and thus achieve rapid dissolution, the solvent velocity must exceed the terminal polymer particle velocity in the solvent in absence of solvent motion. Sparging rates for achieving sufficiently high solvent velocities depend upon the viscosity of the solution, polymer and solvent density, and tank and draft tube dimensions but should be such that the superficial velocity is between 0.01 to 5.0 feet per minute. Superficial velocity is defined as the gas flow rate divided by the flow area. In tanks without draft tubes, this area is the tank cross-section. If draft tubes are employed, the area is the cross-section of that portion of the tank where upflow of the gas occurs. Usually the upflow area will be between one-quarter to one-half of the total tank cross-section. Draft tubes allow for a more efficient dispersion and represent the preferred method of this invention. As above noted, more than one draft tube may be used and they may be arranged in various patterns as shown in FIG. 2 above discussed. The sparging is preferably accomplished through a multiplicity of gas ports. Individual gas ports should not exceed 1.0 inch in size and preferably should be one-fourth inch in diameter. Of course, as above noted, porous septum may be employed instead of simple ports. However, where the gas ports are employed they should be separated so as to prevent coalescense of gas bubbles from different ports. Thus the separation distance is a function of solvent height in the tank and should be such that the distance between ports is one-fortieth to one-half the solvent height.

The polymer particles may be either less or more dense than the solvents. For instance, an $8 \times 10^6$ molecular weight polyisoprene crumb, initially is less dense but later becomes more dense than the crude oil used as a solvent. The low initial effective density is due to air trapped in the crumb and its release as the crumb becomes solvated with solvent. The buoyant and more dense particles tend to collect and agglomerate in regions of the dissolution tank where flow is zero and very slow. Such regions occur in tank corners and at the solvent top surface near the tank wall. Baffles, installed as shown in FIG. 3, prevent such an occurrence.

Concentration of polymer to be dissolved in the batch process is determined by the viscosity of the final solution. The highest concentration is such that the final viscosity does not exceed about 200 centipoises at a shear rate of 100/secs. For high molecular weight polymers this concentration is about 0.5 to 2% by weight, based on total weight of polymer and solvent. The dissolution rate is almost a linear function of the ratio of surface area to mass of polymer. Thus the smaller particles have a faster dissolution rate. Small particles may be prepared with conventional shreaders, extruded and then cut as shown in U.S. Pat. No. 2,771,458, or they may be obtained in a crumb form. Crumb is preferred to cut or shreaded material since crumb has a highly convoluted surface and offers a larger surface area per unit volume than the other particles. The size particles to be employed in this process ranges from micron size, as for example a powder, to 1.0 inch size crumb or to cut particles. The dissolution rate is further enhanced by the choice of a good solvent of low viscosity in the range of 0.5 to 20 centipoises, and elevated temperatures.

If higher than available temperatures are desired, the solvent may be preheated or the dissolution tank may contain heating elements. In the case of heating elements the heating surface temperature must be limited so as not to degrade the polymer. In the case of polyisoprene, this temperature ranges from about 200° to 300°F. Further, the temperature in the tank should at all times be less than the first boiling point of the solvent to prevent significant loss of solvent in low pressure dissolution tanks.

The pressure maintained in the dissolution vessel is preferably in the range of from about 0 inches of water to about three-fourth inches of water, with pressure of the order of about one-half inches of water being preferred. Higher pressures, i.e., in the order of several psia or more, may be employed but are not generally recommended because they increase the hazards and expenditures of capital required to provide the reactor without corresponding improvements in the process.

In the following table the results of several runs with polyisoprene and polyisobutylene in crude oil are disclosed in order to illustrate but not limit the invention.

Table 1

| Polymer | Solvent | Temp. (°F) | Solvent Viscosity (cp) | Dissolution Tank Diam. (in) | Draft Tube | Sparge Rate* (ft/min) | Particle Size (in) | Concentration (%w) | Initial Mol Wt | Final Mol Wt | Time to Dissolve (hrs) | Remarks |
|---|---|---|---|---|---|---|---|---|---|---|---|---|
| Polyisoprene | Crude oil | 90 | 2 | 18 | yes | 0.9 | ⅜" crumb | 0.92 | $8 \times 10^6$ | $7.3 \times 10^6$ | 120 | |
| Polyisoprene | Crude oil | 90 | 2 | 18 | yes | 2.5 | ⅜" cut | 0.94 | $8 \times 10^6$ | $7.2 \times 10^6$ | 160 | |
| Polyisoprene | Crude oil | 70 | 4 | 12 | no | 0.5 | ¼" crumb | 2.00 | $8 \times 10^6$ | $8 \times 10^6$ | 47 | Approx. ½ of polymer dissolved. Run terminated. |
| Polyisobutylene | Crude oil | 140 | 1 | 23 | no | 0.7 | ¼" cut | 0.85 | $4.7 \times 10^6$ | $4.5 \times 10^6$ | 84 | |

*Superficial velocity

In the present invention specific relationships of vessel dimensions and flow rates during operation of the process are important in designing the apparatus. For example, it is preferred that the cross-sectional areas of the compartments in which liquid flows in opposite directions be such that the pressure drop due to the flow in them is approximately equal. Thus, it is desirable that the cross-sectional area of the annular space outside the tubes be larger than that of the tubular space because the annular space has more surface friction. In single draft tube systems a useful range for the ratio of draft tube to annular cross-sectional area is between 0.25 and 1.5 while 0.48 is the preferred ratio. Usually it is undesirable to have the total cross-sectional area of compartments in which flow is in one direction more than approximately two times as great as the cross-sectional area of compartments in which flow is in the opposite direction. To provide for unobstructed circulation of the solvent slurry from one compartment into another, it is preferable that the liquid space above the draft tube and the liquid space below the draft tube in a vessel of circular cross-section each be approximately equal to the distance between the draft tube and tank wall. It is preferred that the compartments of the dissolution vessel be relatively elongated, for example, that the ratio of lengths to cross-sectional area of the compartments be at least about 0.15 (l/ft) and preferably from about 0.25 (l/ft) to about 0.5 (l/ft), or greater.

We claim as our invention:

1. A method for dissolving an essentially undegraded polymer in a solvent comprising:
   introducing the essentially undegraded polymer into the solvent to form a slurry of small undegraded solid particles in the solvent;
   providing a vapor zone above a liquid zone in a vessel which is partitioned into at least two compartments which are in liquid communication with each other both above and below the partition;
   dispersing the slurry in the liquid zone;
   admitting a dispersed stream of gas into at least one but less than all of the compartments, whereby the slurry content of each compartment into which gas is flowing is caused to rise in the compartment, flow into another compartment over the top of the partition, descend into the other compartment and flow back into each of the compartments into which the dispersed stream of gas is introduced;
   recycling gas from the vapor zone; and
   removing dissolved essentially undegraded polymer and solvent from the liquid zone.

2. The process of claim 1 wherein the method is carried out continuously by recirculating gas continuously through the compartment and continuously withdrawing dissolved polymer and solvent and continuously adding polymer particles and fresh solvent.

3. The method of claim 1 wherein the dissolution is carried out as a batch process.

4. The method of claim 1 wherein the concentration of dissolved polymer in solvent is about 0.5 to 2% by weight, based on a total weight of polymer and solvent.

5. The method of claim 1 wherein the gas introduced into the dissolution vessel is a non-oxidizing gas.

6. The method of claim 1 wherein the polymer is polyisoprene of about $8 \times 10^6$ molecular weight in the form of crumb.

7. The method of claim 6 wherein the crumb varies in particle size from micron size to about 1.0 inch size.

8. The method of claim 1 wherein the viscosity of the solvent ranges from about 0.5 to about 20 centipoises.

9. The method of claim 1 wherein the polymer is polyisoprene and the dissolution vessel is heated to about 200°F.

10. The method of claim 1 wherein the molecular weight of the polymer ranges from about $5 \times 10^6$ to about $20 \times 10^6$.

11. The method of claim 1 wherein the gas is introduced through individual gas ports of less than 1.0 inch in size.

12. The method of claim 1 wherein the gas is introduced through gas ports of about one-sixteenth to 1.0 inch in diameter.

13. The method of claim 1 wherein the separation distance between gas ports through which the gas is introduced ranges from one-fortieth to one-half the solvent height in the dissolution vessel.

14. The method of claim 1 wherein the gas is dispersed by porous septa.

* * * * *